United States Patent
Dewald et al.

(10) Patent No.: US 7,364,326 B2
(45) Date of Patent: Apr. 29, 2008

(54) MULTIPLE LIGHT SOURCE ILLUMINATION FOR IMAGE DISPLAY SYSTEMS

(75) Inventors: Duane S. Dewald, Dallas, TX (US); Steven M. Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 110 days.

(21) Appl. No.: 11/005,863

(22) Filed: Dec. 6, 2004

(65) Prior Publication Data

US 2006/0120099 A1    Jun. 8, 2006

(51) Int. Cl.
*F21V 7/04* (2006.01)
*G03B 21/28* (2006.01)

(52) U.S. Cl. ............... 362/298; 362/242; 362/551; 362/343; 353/94; 353/99

(58) Field of Classification Search ........... 362/551, 362/552, 234, 298, 297, 346, 343, 347, 241, 362/242; 353/81, 94, 98, 99
See application file for complete search history.

(56) References Cited

U.S. PATENT DOCUMENTS

| | | | |
|---|---|---|---|
| 4,871,249 A * | 10/1989 | Watson ................ | 356/73 |
| 5,272,570 A * | 12/1993 | Yoshida et al. ........ | 359/853 |
| 5,386,250 A | 1/1995 | Guerinot | |
| 5,625,738 A * | 4/1997 | Magarill ................ | 385/146 |
| 6,332,688 B1 * | 12/2001 | Magarill ................ | 359/858 |
| 6,341,876 B1 * | 1/2002 | Moss et al. ............ | 362/268 |
| 6,631,994 B2 * | 10/2003 | Suzuki et al. .......... | 353/77 |
| 6,843,566 B2 | 1/2005 | Mihara | |
| 7,090,357 B2 * | 8/2006 | Magarill et al. ........ | 353/94 |
| 2003/0031031 A1 * | 2/2003 | Tiao et al. ............. | 362/560 |
| 2003/0133299 A1 * | 7/2003 | Chuang ................. | 362/296 |
| 2005/0083685 A1 * | 4/2005 | Yeh et al. .............. | 362/227 |

* cited by examiner

*Primary Examiner*—Thomas M. Sember
(74) *Attorney, Agent, or Firm*—Wade James Brady, III; Frederick J. Telecky, Jr.

(57) ABSTRACT

A method for transmitting light in an image display system includes generating a first cone of light from a first light source. The first cone of light includes a plurality of light beams. A first portion of the first cone is projected in an illumination path. A second portion of the first cone is projected at a surface of a reflector. The second portion of the first cone is reflected to project the second portion of the first cone in the illumination path. The first and second portions of the first cone are received at an entrance of an integrator rod. The second portion of the first cone increases the intensity of light received by the integrator rod.

22 Claims, 3 Drawing Sheets

MULTIPLE LIGHT SOURCE ILLUMINATION FOR IMAGE DISPLAY SYSTEMS

TECHNICAL FIELD OF THE INVENTION

This invention relates in general to image display systems, and more particularly to optical systems implementing micro-mirror based projection display systems.

BACKGROUND

Spatial light modulators used in projection display systems are capable of projecting image details from media sources such as HDTV, DVD, and DVI. Conventional spatial light modulators are limited by their etendue, which dictates the energy available to the system. Specifically, the amount of light within a particular wavelength range that may be accepted by the spatial light modulator is limited by the etendue of the system. Light originating from light sources emitting narrow bands of light are typically not powerful enough to enable the light modulators to generate a correctly colored or sufficiently bright image.

SUMMARY OF THE INVENTION

In one embodiment, a method for transmitting light in an image display system includes generating a first cone of light from a first light source. The first cone of light includes a plurality of light beams. A first portion of the first cone is projected in an illumination path. A second portion of the first cone is projected at a surface of a reflector. The second portion of the first cone is reflected to project the second portion of the first cone in the illumination path. The first and second portions of the first cone are received at an entrance of an integrator rod. The second portion of the first cone increases the intensity of light received by the integrator rod.

Depending on the specific features implemented, particular embodiments of the present invention may exhibit some, none, or all of the following technical advantages. A technical advantage may be that beams of light that are emitted outside the cone of acceptance of the modulator may be reflected such that they are redirected at the integrator rod at an angle within the cone of acceptance. As a result, the intensity of light may be increased from a light source without exceeding the etendue of the modulator. Another technical advantage may be that because beams of light may be redirected, multiple light sources may be simultaneously operated without exceeding the etendue limits of the modulator. As a result, substantially brighter images may be projected.

A further technical advantage may be that the reflector positioned between a light source and an integrator rod may provide a reference point from which the light source or light sources may be mounted. Accordingly, the reflector may provide a reference point from which one or more light sources may be mounted.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1:
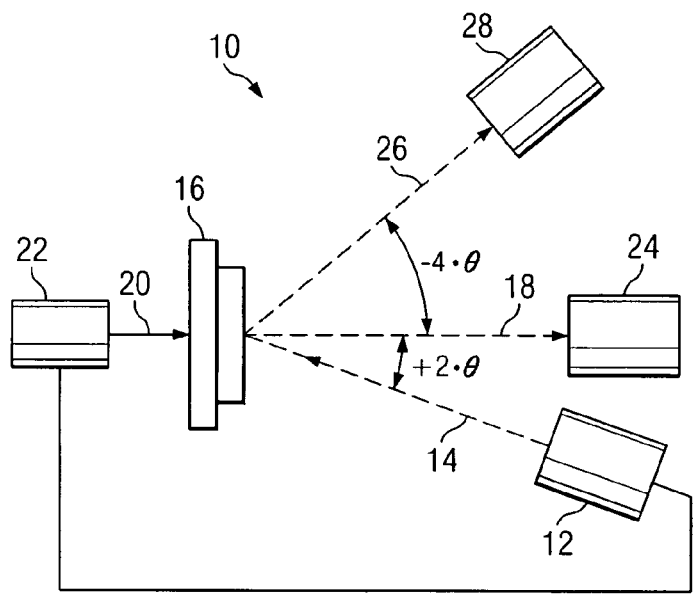
FIG. 1 is a block diagram of one embodiment of a portion of a projection display system.

FIG. 1 is a block diagram of one embodiment of a portion of a projection display system 10. In this example, projection display system 10 includes a light source module 12 capable of generating illumination light beams 14. Light beams 14 are directed from light source module 12 to a modulator 16. Modulator 16 may comprise any device capable of selectively communicating at least some of the received light beams along a projection light path 18. In various embodiments, modulator 16 may comprise a spatial light modulator, such as, for example, a liquid crystal display or a light emitting diode modulator.

In this particular embodiment, modulator 16 comprises a digital micro-mirror device (DMD). The DMD is a micro electromechanical device comprising an array of hundreds of thousands of tilting micro-mirrors. In a flat state, each micro-mirror may be substantially parallel to projection lens 24. From the flat state, the micro-mirrors may be tilted, for example, to a positive or negative angle to alternate the micro-mirrors between an "on" state and an "off" state. For discussion purposes, the angle at which the mirrors may tilt will be measured from projection path 18 and may be designated as theta. In particular embodiments, the micro-mirrors may tilt from +10 degrees to a -10 degrees. In other embodiments, micro-mirrors may tilt from a +12 degrees to a -12 degrees. To permit the micro-mirrors to tilt, each micro-mirror attaches to one or more hinges mounted on support posts, and spaced by means of an air gap over underlying control circuitry. The control circuitry provides electrostatic forces, based at least in part on image data 20 received from a control module 22. In various embodiments, modulator 16 is capable of generating various levels or shades for each color received.

The electrostatic forces cause each micro-mirror to selectively tilt. Incident illumination light on the micro-mirror array is reflected by the "on" micro-mirrors along projection path 18 for receipt by projection lens 24. Additionally, illumination light beams 14 are reflected by the "off" micro-mirrors and directed on off-state light path 26 toward light dump 28. The pattern of "on" versus "off" mirrors (e.g., light and dark mirrors) forms an image that is projected by projection lens 24. As used in this document, the terms "micro-mirrors" and "pixels" are used inter-changeably.

As will be described in more detail with regard to FIG. 2, light source module 12 includes one or more lamps or other light sources capable of generating and focusing an illumination light beam. Where modulator 16 includes a plurality of tilting micro-mirror devices, a tilt on the order of approximately +10 to +12 degrees will result in light source module 12 being in an "on" state. Conversely, a tilt on the order of approximately -10 to -12 degrees will result in light source module 12 being in an "off" state. Although display system 10 is described and illustrated as including a single light source module 12, it is generally recognized that display system 10 may include any suitable number of light sources modules appropriate for generating light beams for transmission to modulator 16.

In particular embodiments, light source module 12 is positioned such that light beam 14 is directed at modulator 16 at an illumination angle of twice theta (where theta is equal to the degree of tilt of the micro-mirror devices in the "on" state). For example, where the micro-mirror devices tilt from approximately +10 to +12 degrees ("on") to approximately −10 to −12 degrees ("off"), light beam 14 may be directed at modulator 16 from light source module 12 positioned at an angle of approximately +20 to +24 degrees from projection path 18. Accordingly, light beam 14 may strike modulator 16 at an angle of approximately +20 to +24 degrees relative to the normal of the micro-mirrors when the micro-mirrors are in a flat state or an untilted position.

When the micro-mirror elements of modulator 16 are in the "on" state direction, illumination beam 14 is reflected approximately normal to the surface of projection lens 24 along illumination path 18. When the micro-mirror elements of modulator 16 are tilted in the "off" state direction, illumination light beam 14 from light source module 12 is reflected along off state light path 26 where it is received by light dump 28. Off state light path 26 is at a negative angle that is approximately equal to four times theta. Thus, where the micro-mirror devices are positioned at approximately −10 to −12 degrees when in the off state, light beam 14 is reflected at an angle of approximately −40 to −48 degrees as measured from projection path 18.

As discussed above, system 10 includes a control module 22 that receives and relays image data 20 to modulator 16 to effect the tilting of micro-mirrors in modulator 16. Specifically, control module 22 may relay image data 20 that identifies the appropriate tilt of the micro-mirrors of modulator 16. For example, control module 22 may send image data 20 to modulator 16 that indicates that the micro-mirrors of modulator 16 should be positioned in the "on" state. Accordingly, the micro-mirrors may be positioned at a tilt angle on the order of approximately +10 to +12 degrees, as measured from projection path 18. Alternatively, control module 22 may send image data 20 to modulator 16 that indicates that the micro-mirrors should be positioned in the "off" state. As such, the micro-mirrors may be positioned at a tilt angle on the order of approximately −10 to −12 degrees, as measured from projection path 18.

The energy available to display system 10 is defined by the etendue of modulator 16. The etendue of modulator 16 is the optical extent of the maximum throughput of modulator 16. Etendue can be defined by a product of the active area of modulator 16 with the square of the sine of the acceptance cone angle of modulator 16. For example, if modulator 16 has an active area of 100 mm$^2$ and an angle of acceptance of +24 degrees, the etendue of display system 10 is approximately 16.5 mm$^2$ steradians. As stated above, the etendue of display system 10 is fixed by modulator 16. Only those wavelengths of light emitted from a particular light source module 12 within the etendue of display system 10 along the illumination path are received at modulator 16. Furthermore, the amount of light within a particular wavelength range is also limited by the etendue of the system. According to the teachings of the invention, this is addressed by increasing the intensity of light received from one or more light sources using a reflector, as described in greater detail below.

Figure 2A:
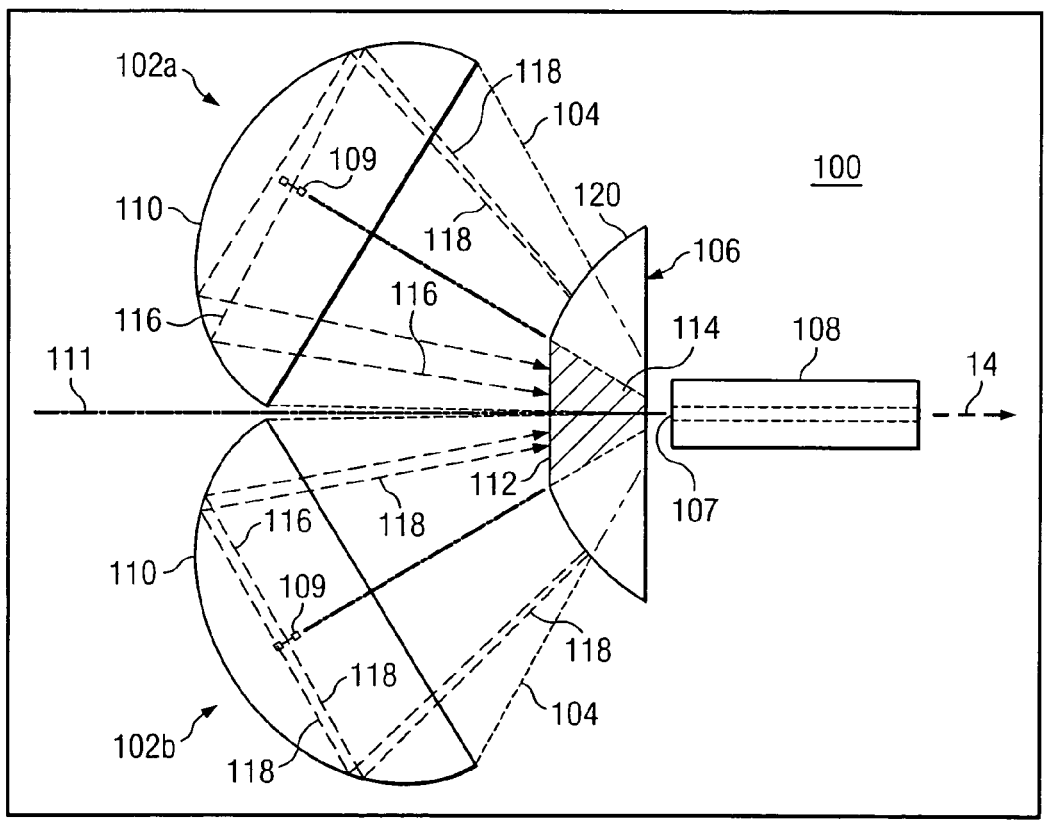
FIGS. 2A-2C are block diagrams of example embodiments of a light source module for a projection display system.
Figure 2B:
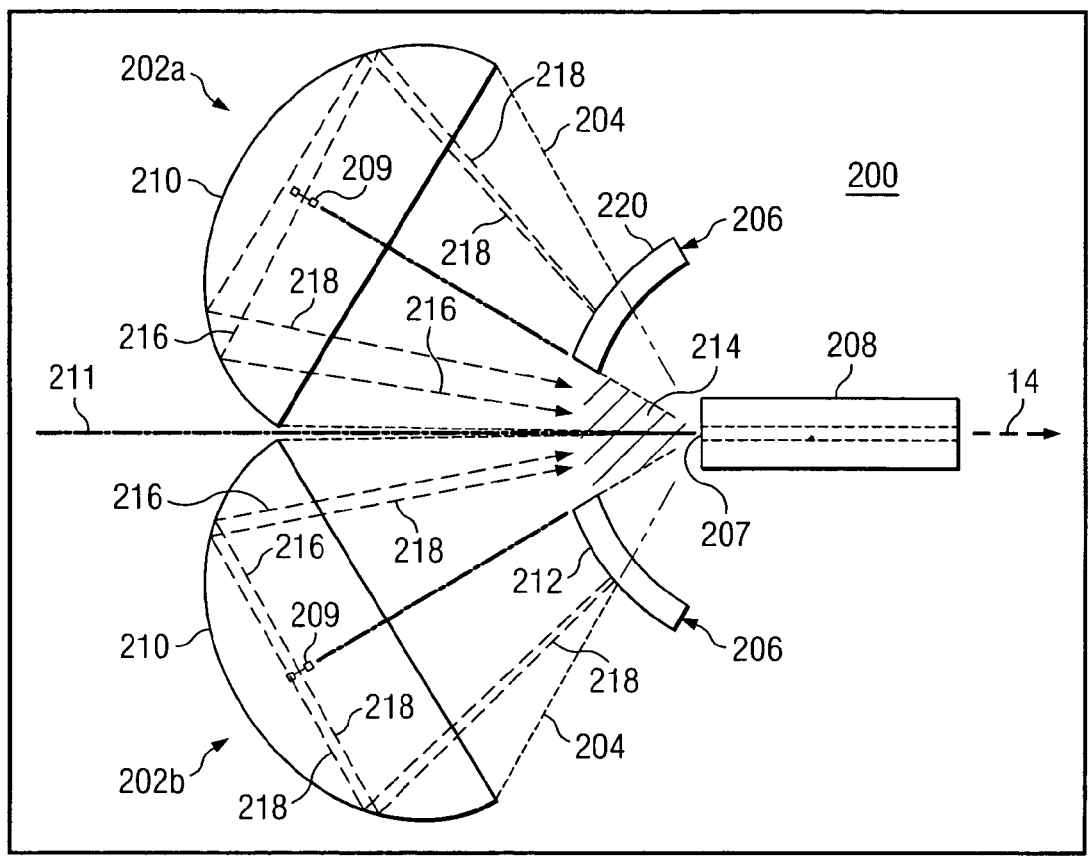
Figure 2C:
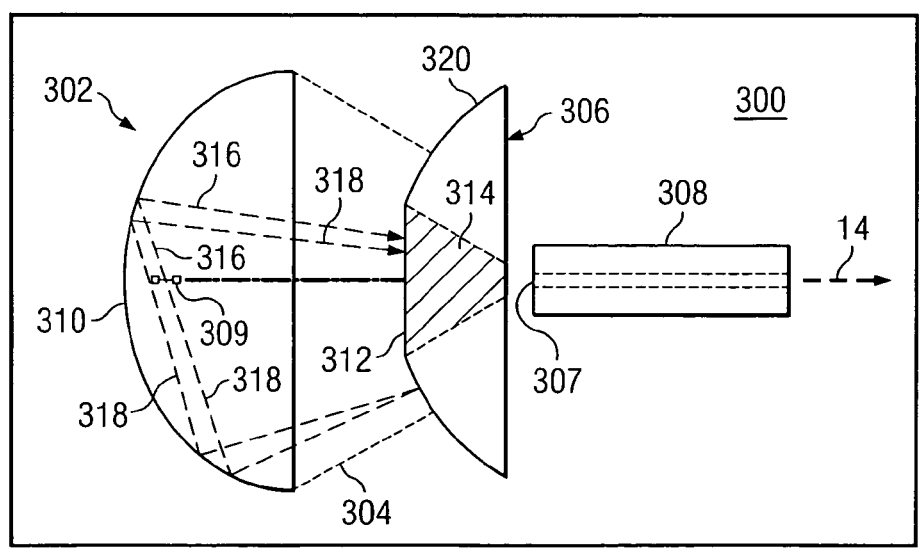

FIGS. 2A-2C are block diagrams of example embodiments of a light source module. In each embodiment, the light source module includes at least one lamp or other light source and a reflector positioned to focus light emitted from the at least one lamp at an integrator rod. Specifically, FIG. 2A comprises a light source module 100, which includes two light sources 102 that each emit a cone of light 104 through a reflector 106 at an integrator rod 108. Integrator rod 108, which includes an entrance 107 of an aperture formed through the length of integrator rod 108, accepts beams of light emitted within the cone of acceptance associated with modulator 16. Integrator rod 108 then takes the non-uniform beam of light and converts it into uniformly distributed light.

In the illustrated embodiment, each light source 102 may include a lamp burner 109 and a lamp reflector 110. In particular embodiments, lamp reflector 110 may include an elliptical reflector. It is recognized, however, that light source 102 may comprise any light source, such as, for example, a metal halide light source, a xenon arc light source, an ultra-high-pressure (UHP) mercury vapor arc lamp, or other broadband light source. Light sources 102 are positioned adjacent to one another and at an angle that defines an axis 111. Axis 111 is substantially aligned with the centerline of integrator rod 108 such that light sources 102 are positioned to emit beams of light projected toward integrator rod 108.

Each light source 102 emits an elliptical cone of light 104, which can be measured relative to the center line of light source 102 or relative to axis 111. In particular embodiments, the cone of light 104 associated with each light source 102 may be on the order of ±30 degrees, as measured from the center line of the emitting light source 102. Accordingly, the cone of light 104 of each light source 102 may be on the order of 60 degrees, as measured from axis 111. The combination of cones of light 104 from the two light sources 102 results in a total cone of light of 120 degrees. As described above, if modulator 16 has an active area of 100 mm$^2$ the angle of acceptance of modulator 16 is one the order of ±24 degrees.

Typically, only the beams of light received within the angle of acceptance of modulator 16 are received by modulator 16. The beams of light outside the angle of acceptance are typically lost. Accordingly, if cones of light 104 are directed at integrator rod 108 (without the intermediate focusing providing by reflector 106), much of the beams within cones of light 104 are not accepted by modulator 16. Furthermore, within each cone of light 104, the beams of light directed from or directed approximately from the center lines of a light source 102 include beams of light of a greater intensity than the intensity of the beams directed from the outer edges of a light source 102. Since light intensity decreases toward the outside of a cone of light 104, many of the more intense beams from each light source 102 will not be received by modulator 16 without redirection.

For the purposes of redirecting beams of light that are outside the angle of acceptance associated with modulator 16, light source module 100 includes reflector 106. In the illustrated embodiment, reflector 106 comprises a spherical mirror that defines an opening 112 formed through the middle of the reflector 106. Reflector 106 is positioned relative to integrator rod 108 such that opening 112 is centered relative to entrance 107 of integrator rod 108. Once properly positioned, reflector 106 may provide a reference point from which light sources 102 may be mounted. Accordingly, reflector 106 may act as a reference surface for light source 102 alignment. When light sources 102 are properly aligned using reflector 106 as a reference point, light sources 102 may be positioned relative to axis 111, which may correspond generally with the center of opening 112.

In particular embodiments, opening 112 may include a circular aperture cut into spherical reflector 106. Opening 112 may be made non-circular, however, for display systems 10 that operate with non-symmetric illumination cones. The sizes of spherical reflector 106 and opening 112 are dependent upon the relative distances between light sources 102, spherical reflector 106 and integrator rod 108. However, spherical reflector 106 and opening 112 are sized such that, from each light source 102, a portion of the beams of light are reflected by spherical reflector 106 and a portion of the beams are passed through opening 112. In particular embodiments, opening 112 may be sized such that only beams directed at reflector 106 at an angle of approximately ±28-30 degrees are passed through opening 112. Thus, opening 112 generally operates to define an illumination path 114 for beams of light within the cone of acceptance of modulator 16.

As one example, a first portion of beams 116 emitted from lamp burner 109 are projected to reflect from lamp reflector 110 in a manner that directs the first portion of beams 116 within the cone of acceptance of modulator 16. Accordingly, first portion of beams 116 pass directly through opening 112. A second portion of beams 118 emitted from lamp burner 109 are projected to reflect from lamp reflector 110 in a manner that directs the second portion of beams 118 outside the cone of acceptance of modulator 16. Second portion of beams 118 is reflected from a surface 120 of spherical reflector 106 and redirected back toward light source 102a. In particular embodiments, the reflected path of second portion of beams 118 may be substantially the same as the initial path of second portion of beams 118. Second portion of beams 118 is then reflected from lamp reflector 110 of light source 102a such that the second portion of beams 118 passes substantially through the originating arc in such a path that the light is reflected into the cone of acceptance of modulator 16. Because second portion of beams 118, as redirected, is substantially aligned with opening 112 as it approaches integrator rod 108 the second time, second portion of beams 118 passes through opening 112 and is accepted by integrator rod 108. Thus, second portion of beams 118 is within illumination path 114 as it approaches spherical reflector 106 the second time. Although first and second portions of beams 116 and 118 are described as being emitted from light source 102a, it is generally recognized that many such beams may be emitted from light sources 102a and 102b.

The redirection of beams of light results in the acceptance of beams that would conventionally be lost because their emission is outside the cone of acceptance of modulator 16. Because multiple light sources 102 may be used simultaneously, the intensity of the light can be increased. Redirection of beams outside the cone of acceptance of modulator 16 results in increased intensity of light received by integrator rod 108 and modulator 16. As a result, the etendue of light sources 102 may be made substantially equal to the etendue of modulator 16. Accordingly, a substantially brighter image is received by projection lens 24.

Modifications, additions, or omissions may be made to light source module 100 without departing from the scope of the invention. The components of light source module 100 may be integrated or separated according to particular needs. For example, although second portion of beams 118 is illustrated as being reflected four times (once from a surface 120 of spherical reflector 106 and three times from lamp reflector 110 of light source 102), it is generally recognized that second portion of beams 118 may be reflected any appropriate number of times until second portion of beams 118 approaches integrator rod 108 at appropriate angles within illumination path 114. As used in this document, "each" refers to each member of a set or each member of a subset of a set.

FIG. 2B is a block diagram of an alternative embodiment of a light source 200. Specifically, light source module 200 includes two light sources 202 that each emit a cone of light 204 directed generally toward a set of reflectors 206 and an integrator rod 208. Light sources 202, the emitted cones of light 204, and integrator rod 208 (which includes an entrance 207 to an aperture formed throughout integrator rod 108) may be substantially similar to light sources 102 and integrator rod 108 described above with regard to FIG. 2A.

For the purposes of redirecting beams of light from light sources 202 that are outside the angle of acceptance associated with modulator 16, light source module 200 includes a pair of reflectors 206. Each reflector 206 comprises a convex mirror that acts in combination to define an opening 212. In particular embodiments, opening 212 may be centered relative to an axis 211 substantially aligned with a centerline of an opening 207 of integrator rod 208. In particular embodiments, opening 212 may include a substantially circular opening. Opening 212, however, may be made noncircular for display systems 10 that operate with nonsymmetric illumination cones.

Similar to light source module 100, the sizes of each reflector 206 and the size of opening 212 are dependent upon the relative distances between light sources 202, reflectors 206, and integrator rod 208. However, reflectors 206 and opening 212 are sized such that a portion of the beams emitted by each light source 202 are reflected by a corresponding reflector 206 and a portion of the beams from each light source 202 are passed through opening 212. In particular embodiments, opening 212 may be sized such that only beams directed at reflectors 206 at an angle of approximately ±28-30 degrees are passed through opening 212. Thus, opening 212 generally operates to define an illumination path 214 for beams of light within the cone of acceptance of modulator 16.

As an example, a first portion of beams 216, which is emitted from a lamp burner 209 are projected to reflect from a lamp reflector 210 in a manner that directs the first portion of beams 216 within the cone of acceptance of modulator 16. Accordingly, first portion of beams 216 pass directly through opening 212. A second portion of beams 218 is emitted from lamp burner 209 in a manner that directs the second portion of beams 218 outside the cone of acceptance of modulator 16. Second portion of beams 218 is reflected from a surface 220 of convex mirror reflector 206 and is redirected back toward light source 202a. In particular embodiments, the reflected path of second portion of beams 218 may be substantially the same as the initial path of second portion of beams 218. Second portion of beams 218 is then reflected from lamp reflector 210 of light source 202a such that the second portion of beams 218 passes substantially through the originating arc in such a path that the light is reflected into the cone of acceptance of modulator 16. Because second portion of beams 218, after redirection, is substantially aligned with opening 212 as it approaches integrator rod 108, second portion of beams 218 passes through opening 212 and is accepted by integrator rod 208. Thus, second portion of beams 218 is within illumination path 214 as it approaches integrator rod 208 the second time. Although first and second portions of beams 216 and 218 are described as being emitted from light source 202a, it is generally recognized that many such beams may be emitted from light sources 202a and 202b.

Similar to light source module 100, the redirection of beams of light by reflectors 206 results in the acceptance of beams that would conventionally be lost because their emission is outside the cone of acceptance of modulator 16. As a result, the intensity of the light received by integrator rod 208 and modulator 16 may be increased, the etendue of light sources 202 may be made substantially equal to the etendue of modulator 16, and a substantially brighter image may be received by projection lens 24.

FIG. 2C is a block diagram of an alternative embodiment of a light source 300. Specifically, light source module 300 includes a single light source 302 that emits a cone of light 304 projected generally toward a reflector 306 and an integrator rod 308. Light source 302, the emitted cone of light 304, and integrator rod 308 (which includes an entrance 307 to an aperture formed throughout integrator rod 308) may be substantially similar to light sources 102 and 202 and integrator rods 108 and 208 described above with regard to FIGS. 2A and 2B.

For the purposes of redirecting beams of light that are outside the angle of acceptance associated with modulator 16, light source module 300 includes a reflector 306. In the illustrated embodiment, reflector 306 comprises a spherical mirror that includes an opening 312 formed through the middle of reflector 306. Reflector 306 is positioned relative to light source 302 such that the center of opening 312 is substantially aligned with the center of light source 302 and entrance 307 of integrator rod 308. In particular embodiments, opening 312 may include a circular aperture cut into spherical reflector 306. Opening 312 may be made non-circular, however, for display systems 10 that operate with non-symmetric illumination cones.

Similar to light source module 100, the size of spherical reflector 306 and the size of opening 312 are dependent upon the relative distances between light source 302, spherical reflector 306, and integrator rod 308. However, spherical reflectors 306 and opening 312 are sized such that a portion of the beams of light emitted by light source 302 are reflected by spherical reflector 306 and a portion of the beams are passed through opening 312. In particular embodiments, opening 312 may be sized such that only beams directed at spherical reflector 306 at an angle of approximately ±28-30 degrees are passed through opening 312. Thus, opening 312 generally operates to define an illumination path 314 for beams of light within the cone of acceptance of modulator 16.

As an example, a first portion of beams 316 emitted from a lamp burner 309 are projected to reflect from lamp reflector 310 in a manner that directs the first portion of beams 316 within the cone of acceptance of modulator 16. Accordingly, first portion of beams 316 pass directly through opening 312. A second portion of beams 318 emitted from lamp burner 309 are projected to reflect from lamp reflector 310 in a manner that directs the second portion of beams 318 outside the cone of acceptance of modulator 16. Second portion of beams 318 is reflected from a surface 320 of the spherical reflector 306 and is redirected back toward light source 302. In particular embodiments, the reflected path of second portion of beams 318 may be substantially the same as the initial path of second portion of beams 319. Second portion of beams 318 is then reflected from lamp reflector 310 of light source 302 such that the second portion of light beams 318 passes substantially through the originating arc in such a path that the light is reflected into the cone of acceptance of modulator 16. Because second portion of beams 318, after redirection, is substantially aligned with opening 312 as it approaches integrator rod 308, second portion of beams 318 passes through opening 312 and is accepted by integrator rod 308. Thus, second portion of beams 318 is within illumination path 314 as it approaches integrator rod 308 the second time. Although only first and second portions of beams 316 and 318 are described as being emitted from light source 302, it is generally recognized that many such beams may be emitted from light source 302.

Similar to light source module 100, the redirection of beams of light by spherical reflector 306 results in the acceptance of beams that would conventionally be lost because their emission is outside the cone of acceptance of modulator 16. As a result, the intensity of the light received by modulator 16 may be increased, the etendue of light source 302 may be made substantially equal to the etendue of modulator 16, and a substantially brighter image may be received by projection lens 24.

Figure 3:
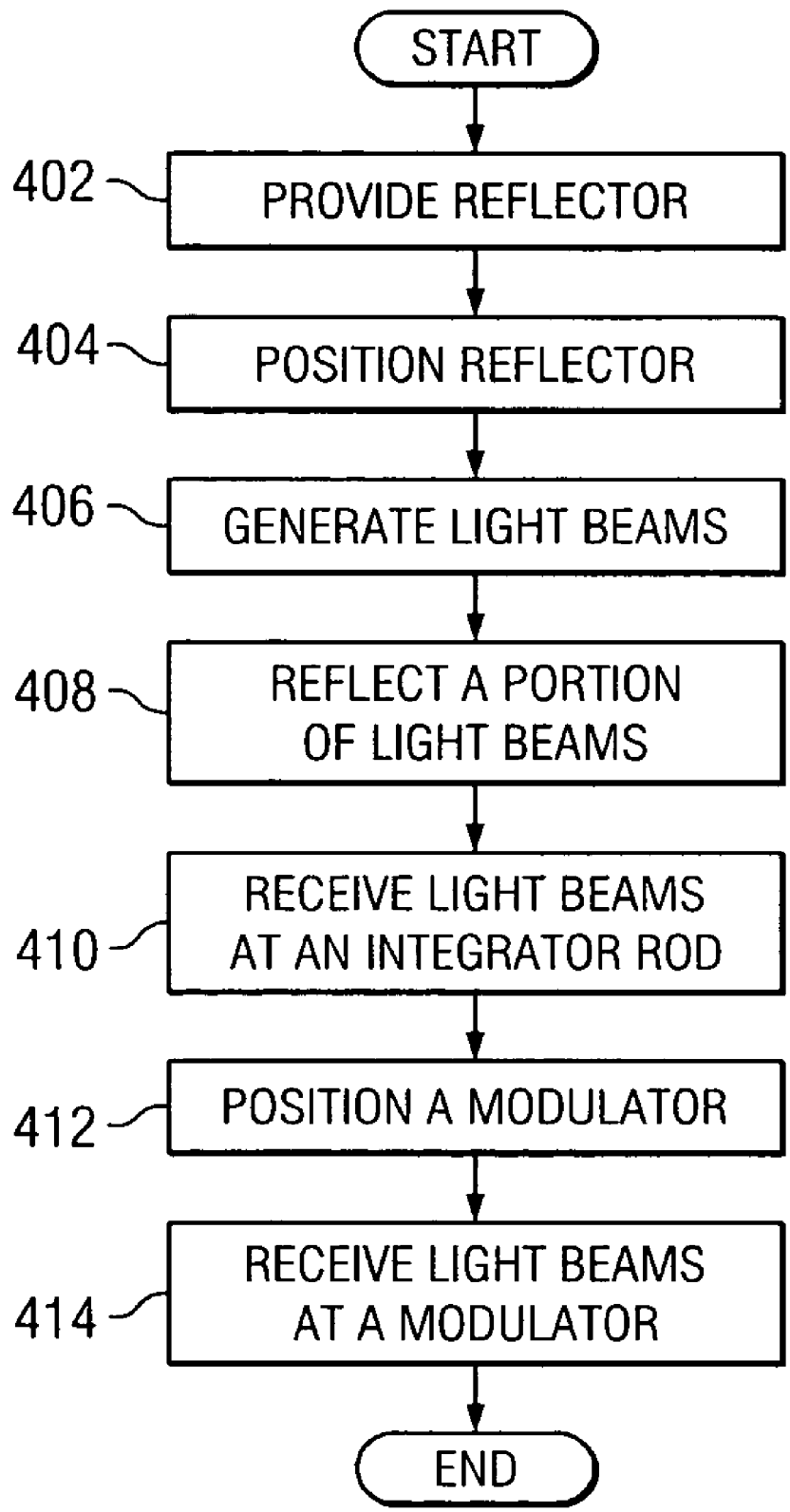
FIG. 3 is a flow chart of a method of projecting light from a light source module with multiple light sources.

FIG. 3 is a flow chart illustrating a method of projecting light from a light source module 12 in accordance with various embodiments of the present invention. At step 402, a reflector is provided in light source module 12 of image display system 10. In particular embodiments, the reflector may include a spherical mirror like that described above with regard to reflector 106 of FIG. 2A. Thus, the reflector may include an aperture formed through the center of the spherical mirror to define an opening. In other embodiments, the reflector may include a pair of reflectors like that described above with regard to reflectors 206 of FIG. 2B. In such embodiments, the pair of reflectors may be positioned to define an opening.

At step 404, the reflector may be positioned between one or more light sources and an integrator rod. In particular embodiments, the reflector may be positioned such that the opening defined by the reflector is substantially aligned with an entrance of the integrator rod. The opening may define an illumination path that corresponds generally with the cone of acceptance of modulator 16. Additionally, and as described above, once the reflector is properly positioned, the reflector may provide a reference point from which the light sources may be mounted. Thus, the reflector may act as a reference surface for proper alignment of the light sources within light source module 12.

At step 406, light beams are generated within light source module 12. The light beams may comprise one or more cones of light that are generated from one or more light sources. The cones of light are directed generally toward the reflector and the integrator rod. In particular embodiments, light source module 12 may be configured substantially like light source module 100 or light source module 200 described above with regard to FIGS. 2A and 2B, respectively. Thus, light source module 12 may include two light sources directing two respective cones of light at the integrator rod. In other embodiments, light source module 12 may be configured substantially like light source module 300 described above with regard to FIG. 2c. In such embodiments, light source module 12 may include a single light source from which a single cone of light beams is emitted.

Each cone of light emitted within light source module 12 may include a portion of light beams that are directed at the surface of the reflector and a portion of beams of light that are directed at the opening defined by the reflector. The portion of the light beams directed at the opening may pass through the opening and into the illumination path. Because this portion of the light beams is within the cone of acceptance of modulator 16, this portion of the light beams may be received by the integrator rod. The portion of beams of light that are directed at the surface of the reflector, however, are reflected at step 408. In particular embodiments, the reflected light beams may be redirected toward the light source. The light beams may then be reflected from a lamp reflector of the light source such that the light beams are projected into the illumination path that corresponds with the acceptance code of modulator 16.

At step 412, modulator 16 is positioned to receive the light beams. As discussed above, modulator 16 may comprise an array of micro-mirror devices that may be tilted to receive the plurality of light beams in particular embodiments. Positioning the modulator 16 may include tilting all or a portion of the micro-mirror devices at a tilt angle. The tilt angle is generally a positive onehalf of the first illumination angle. Stated differently, the first illumination angle is generally twice the first tilt angle. Accordingly, where the plurality of beams are transmitted at a first illumination angle between a +20 and a +24 degrees, the first tilt angle may be between a +10 and a +12 degrees, as measured from projection path 18. At step 414, the plurality of light beams are received at modulator 16. Upon being received by modulator 16, at least a portion of the light beams may be directed to projection lens 24 along projection path 18.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An image display system comprising:
   a modulator comprising an array of micro-mirror devices, the modulator operable to receive a plurality of light beams;
   a light source module operable to generate the plurality of light beams, the light source module comprising:
      a first light source operable to:
         generate a first cone of light comprising a plurality of light beams; and
         project a first portion of the first cone into an illumination path;
      a second light source operable to:
         generate a second cone of light comprising a plurality of light beams; and
         project a first portion of the second cone into the illumination path,
      wherein the first and second light sources are further operable to simultaneously generate the first and second cones of light; and
      a spherical reflector having an opening formed through the reflector, the opening defining the illumination path, the illumination path within a cone of acceptance associated with the modulator, the reflector operable to:
         reflect a second portion of the first cone in cooperation with a lamp reflector to project the second portion of the first cone into the illumination path to increase the intensity of the plurality of light beams received by the modulator; and
         reflect a second portion of the second cone to project the second portion of the second cone into the illumination path to increase the intensity of the plurality of light beams received by the modulator.

2. An image display system comprising:
   a modulator comprising an array of micro-mirror devices, the modulator operable to receive a plurality of light beams;
   a light source module operable to generate the plurality of light beams, the light source module comprising:
      a first light source comprising a lamp reflector and operable to:
         generate a first cone of light comprising a plurality of light beams; and
         project a first portion of the first cone into an illumination path; and
      a reflector spaced apart from the lamp reflector and comprising a convex portion facing the lamp reflector, wherein the convex portion is operable to reflect a second portion of the first cone in cooperation with the lamp reflector to project the second portion of the first cone into the illumination path to increase the intensity of the plurality of light beams received by the modulator.

3. The system of claim 2, wherein:
   the reflector is further operable to reflect the second portion of the first cone from a surface of the reflector to project the second portion of the first cone at the lamp reflector; and
   the lamp reflector operable to:
      reflect the second portion of the first cone to project the second portion of the first cone substantially across an arc of the light source; and
      reflect the second portion of the first cone into the illumination path.

4. The system of claim 2, wherein the reflector includes an opening formed through the reflector, the opening defining the illumination path, the illumination path within a cone of acceptance associated with the modulator.

5. The system of claim 2, wherein the reflector comprises a spherical reflector.

6. The system of claim 2, wherein the reflector comprises a pair of reflectors positioned to define an opening for the illumination path.

7. The system of claim 2, wherein:
   the light source module further comprises a second light source operable to:
      generate a second cone of light comprising a plurality of light beams; and
      project a first portion of the second cone into the illumination path; and
   the reflector is further operable to reflect a second portion of the second cone in cooperation with a lamp reflector to project the second portion of the second cone into the illumination path to increase the intensity of the plurality of light beams received by the modulator.

8. The system of claim 7, wherein the first and second light sources are further operable to simultaneously generate the first and second cones of light.

9. The system of claim 7, wherein:
   the reflector is further operable to reflect the second portion of the second cone from a surface of the reflector to redirect the second portion of the second cone at the first light source; and
   the second light source is operable to:
      reflect the second portion of the second cone to project the second portion of the first cone substantially across an arc of the light source; and
      reflect the second portion of the second cone into the illumination path.

10. The system of claim 2, wherein the reflector is positioned between the first light source and an integrator rod, the reflector defining an opening substantially aligned with an entrance of the integrator rod.

11. The system of claim 2:
wherein the light source module is operable to generate the plurality of light beams toward a point; and
wherein the convex portion includes an opening centered about the point.

12. A method for transmitting light in an image display system, comprising:
generating a first cone of light from a first light source, the first cone of light comprising a plurality of light beams, a first portion of the first cone projected in an illumination path, a second portion of the first cone projected at a surface of a reflector that comprises a convex portion facing the first light source;
reflecting the second portion of the first cone to project the second portion of the first cone in the illumination path; and
receiving the first and second portions of the first cone at an entrance of an integrator rod, the second portion of the first cone increasing the intensity of light received by the integrator rod;
wherein the step of reflecting the second portion of the first cone comprises:
reflecting the second portion of the first cone from the surface of the reflector to redirect the second portion at a lamp reflector apart from the reflector; and
reflecting the second portion of the first cone from the lamp reflector into the illumination path.

13. The method of claim 12, wherein the reflector comprises a spherical reflector.

14. The method of claim 12, wherein the reflector comprises a pair of reflectors positioned to define an opening for the illumination path.

15. The method of claim 12, further comprising:
generating a second cone of light from a second light source, the second cone of light comprising a plurality of light beams, a first portion of the second cone projected in the illumination path, a second portion of the second cone projected at the surface of the reflector;
reflecting the second portion of the second cone to project the second portion of the second cone in the illumination path; and
receiving the first and second portions of the first cone at the entrance of the integrator rod, the second portion of the first cone increasing the intensity of light received by an integrator rod.

16. The method of claim 15, wherein the first cone of light and the second cone of light are generated simultaneously.

17. The method of claim 15, wherein reflecting the second portion of the second cone comprises:
reflecting the second portion of the second cone from the surface of the reflector to redirect the second portion at a lamp reflector that is part of the second light source and apart from the reflector; and
reflecting the second portion of the second cone from the lamp reflector that is part of the second light source into the illumination path.

18. The method of claim 12, further comprising positioning the reflector between the first light source and the integrator rod, the reflector defining an opening substantially aligned with an entrance of the integrator rod.

19. The method of claim 12, further comprising:
receiving the first and second portions of light beams at a modulator comprising an array of micro-mirror devices; and
positioning the micro-mirror devices at a first tilt angle to receive the first and second portions of light beams.

20. The method of claim 12, wherein the illumination path is within a cone of acceptance associated with the modulator, the illumination path defined by an opening associated with the reflector.

21. An image display system comprising:
a modulator comprising an array of micro-mirror devices, the modulator operable to receive a plurality of light beams;
a light source module operable to generate the plurality of light beams, the light source module comprising:
a first light source operable to:
generate a first cone of light comprising a plurality of light beams; and
project a first portion of the first cone into an illumination path; and
a reflector operable to reflect a second portion of the first cone in cooperation with a lamp reflector to project the second portion of the first cone into the illumination path to increase the intensity of the plurality of light beams received by the modulator;.
a second light source operable to:
generate a second cone of light comprising a plurality of light beams; and
project a first portion of the second cone into the illumination path; and
the reflector is further operable to reflect a second portion of the second cone in cooperation with a lamp reflector to project the second portion of the second cone into the illumination path to increase the intensity of the plurality of light beams received by the modulator;
wherein:
the reflector is further operable to reflect the second portion of the second cone from a surface of the reflector to redirect the second portion of the second cone at the second light source; and
the second light source is operable to:
reflect the second portion of the second cone to project the second portion of the second cone substantially across an arc of the second light source; and
reflect the second portion of the second cone into the illumination path.

22. The system of claim 21, wherein the first and second light sources are further operable to simultaneously generate the first and second cones of light.

* * * * *